United States Patent [19]
Charlot

[11] 3,979,752
[45] Sept. 7, 1976

[54] PULSE-TYPE RADAR WITH MODULATED CARRIER FREQUENCY

[75] Inventor: Jean-Claude Charlot, Paris, France

[73] Assignee: Thomson-CSF, Paris, France

[22] Filed: July 11, 1975

[21] Appl. No.: 595,083

[30] Foreign Application Priority Data
July 12, 1974    France .............................. 74.24365

[52] U.S. Cl. ........................ 343/17.2 R; 343/7 AG
[51] Int. Cl.² ............................................. G01S 9/23
[58] Field of Search ............................... 343/17.2 R

[56] References Cited
UNITED STATES PATENTS

| | | | |
|---|---|---|---|
| 3,114,909 | 12/1963 | Varela............................ | 343/17.2 R |
| 3,163,862 | 12/1964 | Jenny.......................... | 343/17.2 R X |
| 3,290,678 | 12/1966 | Carlsson..................... | 343/17.2 R X |
| 3,858,219 | 12/1974 | Hull .............................. | 343/17.2 R |

*Primary Examiner*—T.H. Tubbesing
*Attorney, Agent, or Firm*—Karl F. Ross; Herbert Dubno

[57] ABSTRACT

A radar system emitting a recurrent sequence of n equispaced bursts of carrier frequency, varying from one burst to the next, has a transmitter including a carrier-frequency generator with a frequency-varying motor driven by a synchronizing circuit to produce a repetitive frequency pattern recurring a whole number of times in a program cycle of $n$ pulse periods. An associated receiver includes a local oscillator whose frequency is incremented, from one pulse period to the next, by a feedback circuit comprising a modulator with inputs connected to the output of this oscillator and to a coupler picking up the instantaneous carrier frequency from the transmitter output; this modulator works into a frequency discriminator, tuned to a predetermined intermediate frequency, returning an error signal to a control input of the oscillator via a multiple integrator concurrently storing all the error signals for the several pulse periods; an adder superposes these error signals upon a monitoring signal extracted at the beginning of each pulse period from the carrier-frequency generator. The multiple integrator includes an operational amplifier with $n$ parallel capacitors in respective feedback paths which are normally open-circuited and are sequentially connected in circuit under the control of a shift register restarted at the beginning of each program cycle. A similar multiple integrator may be inserted in an automatic-gain-control circuit for an intermediate-frequency amplifier in the output of a mixer which heterodynes the received echoes with the local-oscillator output.

10 Claims, 7 Drawing Figures

PULSE-TYPE RADAR WITH MODULATED CARRIER FREQUENCY

FIELD OF THE INVENTION

My present invention relates to a pulse-type radar system emitting equispaced bursts of carrier frequency and feeding received echoes thereof to a utilization circuit, particularly for the tracking of reflecting objects with the aid of a movable range gate adapted to pass an echo pulse within a fraction of an interval (referred to hereinafter as a pulse period) separating successive carrier-frequency bursts.

BACKGROUND OF THE INVENTION

It is useful, for minimizing interference and distortion, to vary the carrier frequency from one burst to another, e.g. by adjusting a magnetron serving as the generator of the periodic carrier-frequency bursts. Heretofore, these adjustments were usually made in a random manner, with suitable compensating changes carried out in the associated receiving channel. These compensating adjustments, generally in the operating frequency of a local oscillator, thus had to be made rapidly and with great precision; this could be done only with rather complex circuitry.

OBJECT OF THE INVENTION

The object of my present invention, therefore, is to provide an improved radar system of the character set forth which can be realized with a simplified circuit arrangement.

SUMMARY OF THE INVENTION

In a system according to my invention, a generator of carrier-frequency bursts is provided with frequency-varying means — such as a stepping motor — controlled by a synchronizing circuit to change the carrier frequency from one burst to the next in a repetitive (e.g. sinusoidal or sawtooth) pattern with a whole number of repetition periods in a program cycle of $n$ pulse periods, each pulse period being introduced by a carrier-frequency burst substantially coinciding with a timing pulse from the synchronizing circuit. A local oscillator, whose operating frequency is variable in a range offset from the carrier-frequency range by a predetermined intermediate frequency, works into a mixer in the incoming channel of the receiving section of the system for heterodyning its operating frequency with the received echoes in the conventional manner; the oscillator frequency is controlled by the output of a discriminator receiving a difference frequency from a modulator whose inputs are respectively connected to the oscillator output and to the outgoing channel of the carrier-frequency generator. A feedback signal developed by the discriminator has a predetermined value when the difference frequency equals the intermediate frequency; otherwise, its value is such as to tend to reduce the deviation therebetween to zero.

In accordance with an important feature of my invention, a multiple integrator is inserted between the discriminator and the control circuit for the operating frequency of the local oscillator, this integrator simultaneously storing feedback signals from each of the $n$ pulse periods of a program cycle over a plurality of such cycles. Since corresponding pulse periods of successive program cycles employ the same carrier frequency, the feedback signal of any one period changes only gradually from one cycle to the next. It is therefore no longer necessary to provide complicated storage circuits for rapidly charging and discharging a capacitor at the beginning and at the end of each pulse period.

Such a multiple integrator, e.g. as known per se from U.S. Pat. No. 3,433,937, may comprise an operational amplifier with $n$ capacitive feedback paths each including a normally open circuit breaker. In my present system these circuit breakers are connected to respective stage outputs of an n-stage shift register for individual closure, during corresponding pulse periods, by a switching signal from the synchronizing circuit appearing successively at these stage outputs. A loading input of the shift register is connected to the synchronizing circuit for entry of the switching signal into the first register stage at the beginning of a program cycle.

Pursuant to another advantageous feature of my invention, a summing circuit in the output of the multiple integrator additively combines the feedback signal issuing therefrom with a monitoring signal from the carrier-frequency generator which is representative of the frequency of the burst of carrier wave transmitted in the current pulse period; the feedback signal, whose value in the case of equality of the difference and intermediate frequencies is then zero, thus becomes an error voltage and will be so referred to hereinafter.

Both the error voltage in the integrator input and the monitoring voltage fed in from the carrier-frequency generator may be held constant, for the duration of a pulse period, by clamping means in the form of sampling and holding circuits known per se.

The synchronizing circuit may comprise a master oscillator working into a harmonic frequency modifier, namely a multiplier or a divider, whereby two pulse-shaping circuits connected to the master oscillator and to the frequency modifier carry pulses of different but harmonically related repetition frequencies or cadences. The lower-frequency pulses energize the loading input of the aforementioned shift register, once per program cycle, whereas the higher-frequency pulses — of $n$ times the cadence of the former — are fed to the shift register as a switching signal.

BRIEF DESCRIPTION OF THE DRAWING

The above and other features of my invention will now be described in detail with reference to the accompanying drawing in which.

SPECIFIC DESCRIPTION

Figure 1:
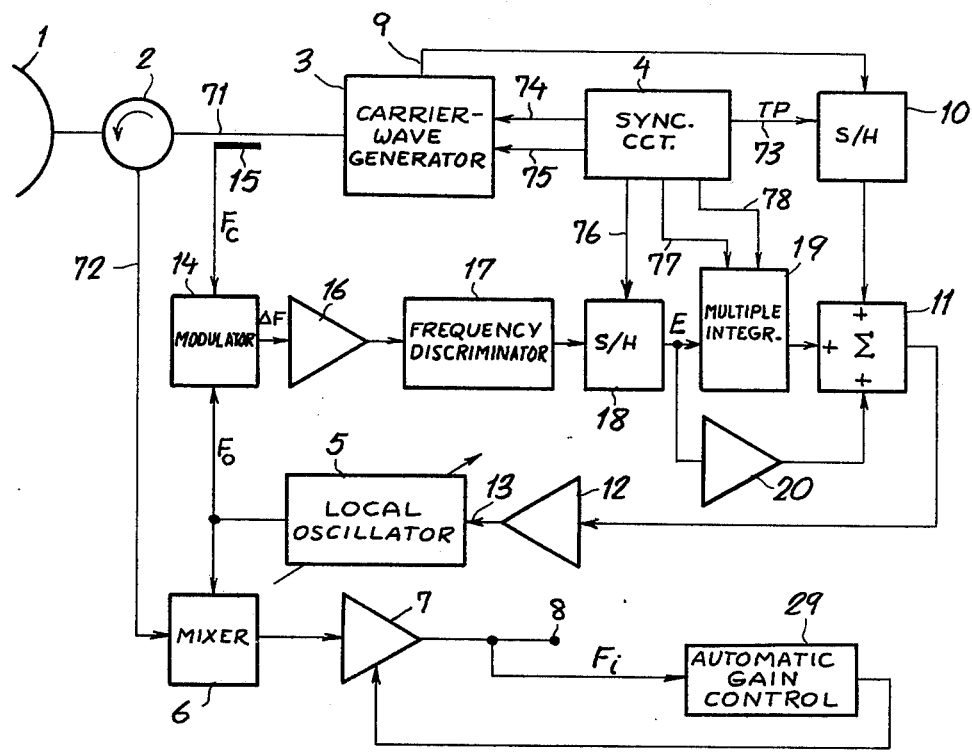
FIG. 1 is a block diagram of a radar system embodying my invention.

In FIG. 1 I have shown a transmit/recive radar antenna 1 connected via a circulator 2 to an outgoing channel 71 and an incoming channel 72. Channel 71 is connected to the output of a carrier-wave generator 3, more fully illustrated in FIGS. 4 and 5, delivering periodic bursts of carrier wave to antenna 1 under the control of a synchronizing circuit 4. An ancillary output 9 of generator 3 carries a monitoring signal, i.e. a voltage representative of the instantaneous magnitude of the carrier frequency, this signal being stored in a sampling and holding (S/H) circuit 10 of conventional design for the duration of a pulse period initiated by a carrier-frequency burst from generator 3. The operation of S/H circuit 10 is controlled by a lead 73 from circuit 4, two other such leads 74, 75 extending to generator 3. A reactive coupling 15 picks up the carrier-wave bursts in channel 71 and delivers them to one input of a modulator 14, these bursts having a carrier frequency $F_c$ which varies from one pulse period to another as more fully described hereinafter. Another input of modulator 14 is energized with the operating frequency $F_o$ of an adjustable oscillator 5, modulator 14 deriving from frequencies $F_c$ and $F_o$ a difference frequency $\Delta F$ which substantially equals a predetermined intermediate frequency $F_i$ during steady-state operation. Oscillator 5 also works into a mixer 6 receiving echoes of the transmitted carrier-wave bursts in the presence of a reflecting target. Mixer 6 thus generates an output signal, essentially of intermediate frequency $F_i$, which is passed by an amplifier 7 via a terminal 8 to a nonillustrated utilization circuit.

An amplifier 16 in cascade with modulator 14 feeds the difference frequency $\Delta F$ to a frequency discriminator 17 which generates an error voltage, of one or the other polarity, whenever that difference frequency deviates from intermediate frequency $F_i$ in one sense or the other. This error signal is stored temporarily, for the corresponding pulse period, in an S/H circuit 18 controlled by synchronizing circuit 4 via a lead 76. Two further output leads 77, 78 of this sync circuit control a multiple integrator 19, more fully described below with reference to FIG. 3, which essentially consists of an operational amplifier provided with $n$ capacitive feedback paths (not shown in FIG. 1) bridged by an ordinary amplifier 20 serving to compensate for residual errors due to any frequency instability of the carrier-wave generator 3. Such compensation will be most effective if amplifier 20 has a gain K satisfying the relationship $K_1.K_2.K = -1$ where $K_1$ is the transfer coefficient of the chain 17 – 19 in volts/Hz and $K_2$ is the transfer coefficient of the combination of local oscillator 5 together with an associated input amplifier 12 in Hz/volt. Amplifier 12, working into a control input 13 of oscillator 5, is driven by an output signal from a summing circuit 11 with three additive inputs respectively connected to S/H circuit 10, integrator 19 and amplifier 20.

Figure 2:
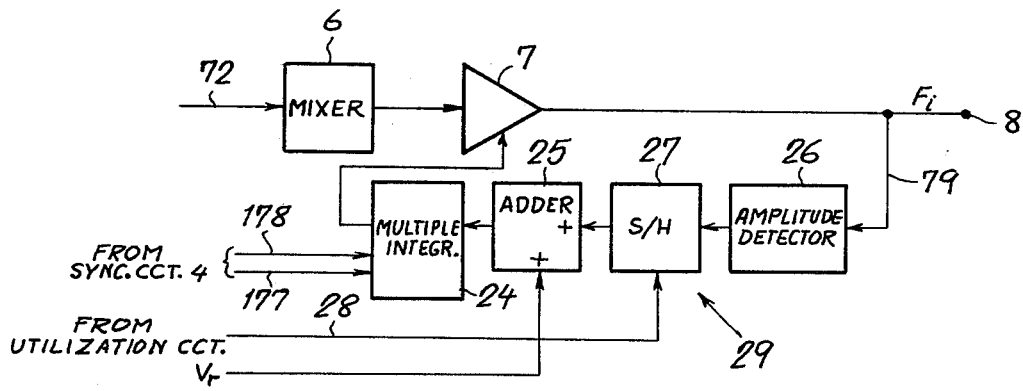
FIG. 2 is a diagram of an automatic-gain-control circuit optionally included in the system of FIG. 1.

Amplifier 7 is shown provided with an automatic-gain control circuit 29 more fully illustrated in FIG. 2. A branch lead 79 feeds the output signal of amplifier 7 to an amplitude detector 26 working via an S/H circuit 27 into one input of an adder 25 receiving on another input a predetermined reference voltage $V_r$. In the tracking mode, when the system has locked on to a reflecting target, the utilization circuit periodically emits on a lead 28 a gating signal within a fraction of any pulse period representing a range gate whose time position in that period is determined by the target distance as is well known in the art. A corrective voltage thus sampled is held for the remainder of the period and superposed upon reference voltage $V_r$ in adder 25 which feeds the combined voltage to another multiple integrator 24 controlled via leads 177, 178 from sync circuit 4. The output of integrator 24, varying from one pulse period to the next, is supplied to a gain-controlling input electrode of amplifier 7.

Figure 3:
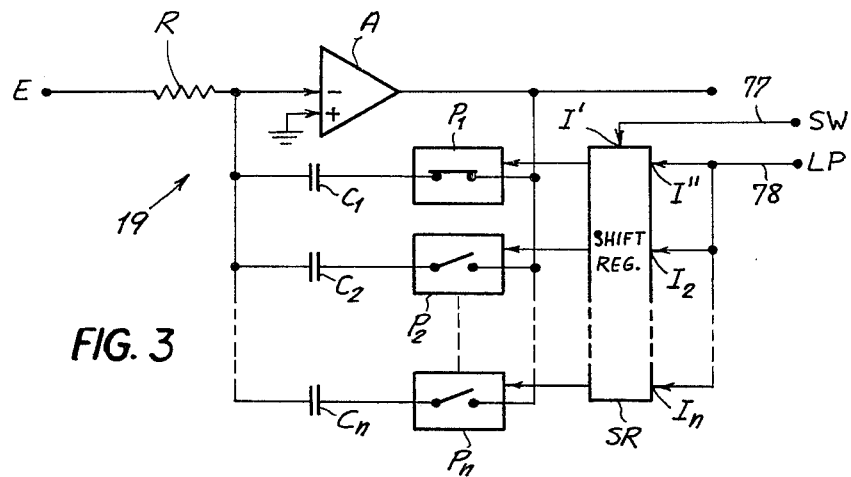
FIG. 3 shows a multiple integrator used in the system of FIG. 1.

FIG. 3 shows the detailed circuitry of multiple integrator 19 which is also representative of integrator 24. An operational amplifier A has a grounded noninverting input (+) and an inverting input (−) receiving the error signal E by way of a resistor R; a multiplicity of parallel feedback paths, including respective capacitors $C_1 - C_n$ in series with circuit breakers $P_1 - P_n$, extend from the output of amplifier A to the inverting input (−) thereof. The circuit breakers, which are normally open, may be designed as conventional analog gates (an open circuit breaker being the equivalent of a closed gate); they are individually controlled by respective stage outputs of an n-stage shift register SR receiving switching pulses SW and loading pulses LP on leads 77 and 78 terminating at respective inputs I' and I''. Loading pulse LP, serving to enter a switching pulse SW — of logical value 1 — in the first register stage at the beginning of a program cycle to connect feedback capacitor $C_1$ in circuit, is also applied in parallel therewith to respective clearing inputs $I_2 - I_n$ of the remaining register stages to cancel any switching pulse SW held over therein from the preceding program cycle; such a situation would occur if the number of pulse periods per cycle were reduced to a value less than $n$. If no modification of the number of pulse periods per cycle is contemplated, the connection to inputs $I_2 - I_n$ can be omitted. In the absence of a loading pulse LP, the $n$-1) switching pulses occurring in the latter part of a cycle merely serve to advance the initially introduced pulse through the consecutive register stages for closing the corresponding circuit breakers $C_2 - C_n$ one after the other.

Figure 4:
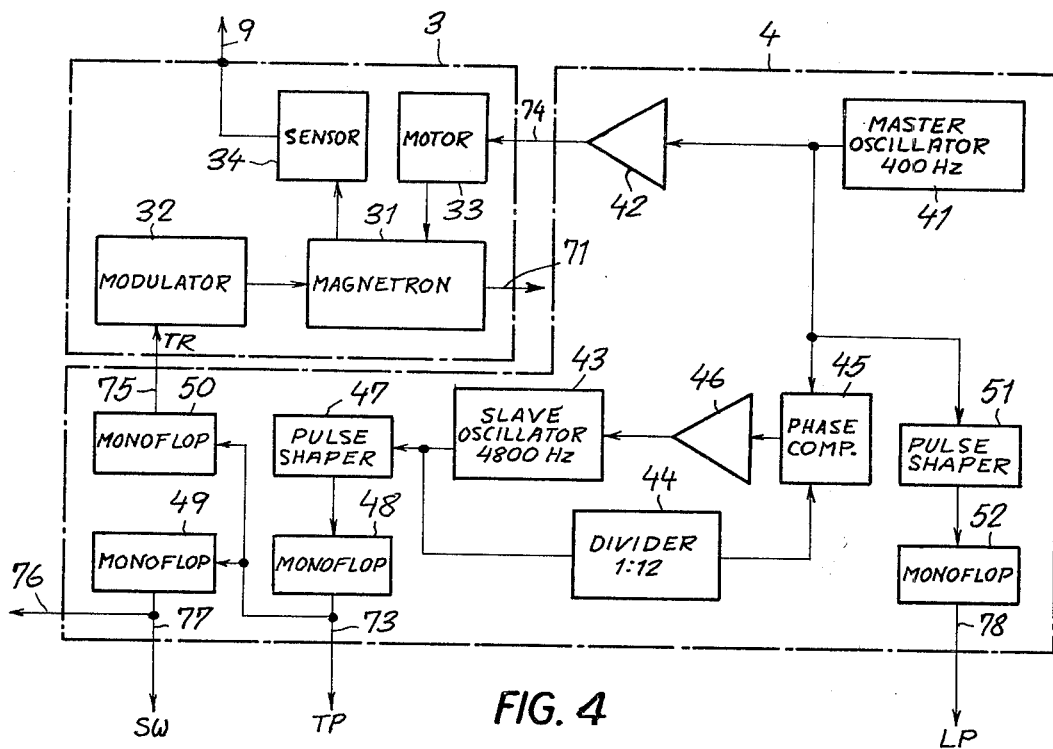
FIG. 4 is a block diagram of a synchronizing circuit for the system of FIG. 1.

In FIG. 4 I have shown the particulars of carrier-wave generator 3 and sync circuit 4. Generator 3 comprises a magnetron oscillator 31 whose frequency is mechanically controlled by a motor 33 and whose output lead 71 is energized at the beginning of each pulse period under the control of a modulator 32 responsive to trigger pulses TR in the output 75 of the sync circuit. A sensor 34 detects the instantaneous carrier frequency produced by magnetron oscillator 31 and converts it into a voltage appearing on monitoring output 9.

Sync circuit 4 comprises a master oscillator 41, here of 400 Hz, which drives the motor 33 through an amplifier 42 to change the carrier frequency in discrete increments, the pattern of frequency modulation recurring every n/k pulse periods where $n$ and $k$ are both integers. In the present instance it is assumed that $n = 12$ and $k = 1$. Oscillator 41 also feeds a pulse shaper 51 working into a monostable multivibrator or monoflop 52 to generate the loading pulse LP at the cadence of 400 Hz. A frequency multiplier connected in parallel with shaping circuit 51, 52 and amplifier 42 comprises a slave oscillator 43, of 4800 Hz nominal frequency, locked in step with master oscillator 41 by a loop circuit including a frequency divider 44 of step-down ratio 1:12, a phase comparator 45 and an amplifier 46. Slave oscillator 43 feeds another pulse shaper 47 working into a monoflop 48 which in turn trips two monoflops 49, 50 with a slight delay. Monoflop 48 emits timing pulses TP on lead 73 extending to S/H circuit 10 (FIG. 1); monoflops 49 and 50 respectively produce switching pulses SW and trigger pulses TR on leads 77 and 75.

Figure 5:
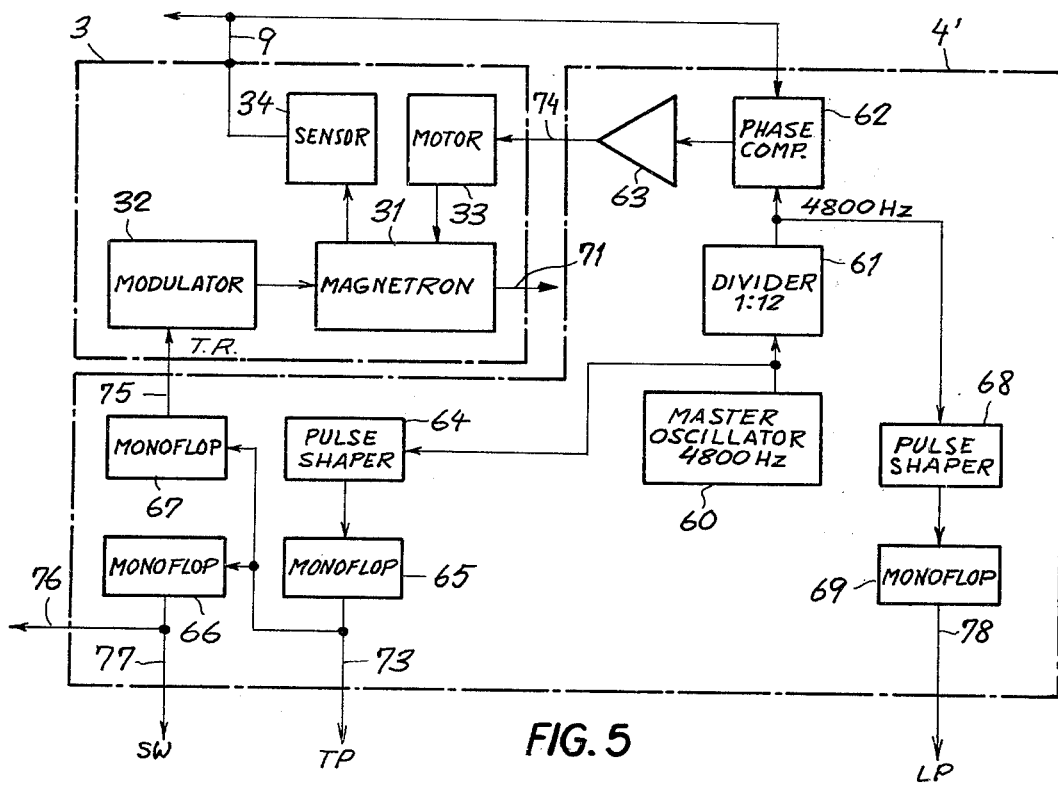
FIG. 5 is a block diagram similar to FIG. 4, showing a modification.

FIG. 5 shows the same carrier-wave generator 3 controlled by a modified sync circuit 4' representing an inversion of circuit 4. Here a master oscillator 60 is tuned to the higher frequency of 4800 Hz and works through a frequency divider 61, again of step-down ratio 1:12, into an amplifier 63 serving to drive the motor 33 at the 400-Hz rate. A phase comparator 62, inserted between divider 61 and amplifier 63, has another input connected to monitoring output 9 carrying the stepped output signal of sensor 34, comparator 62 insuring that the resetting of motor 33 occurs only when its two input signals have the proper phase relationship. Divider 61 feeds a pulse shaper 68 in cascade with a monoflop 69 to generate the loading pulse LP. Master oscillator 60 works into a pulse shaper 64 which drives a monoflop 65 in cascade with two further monoflops 66, 67 for the generation of timing pulses TP, switching pulses SW and trigger pulses TR, respectively.

Figure 6:
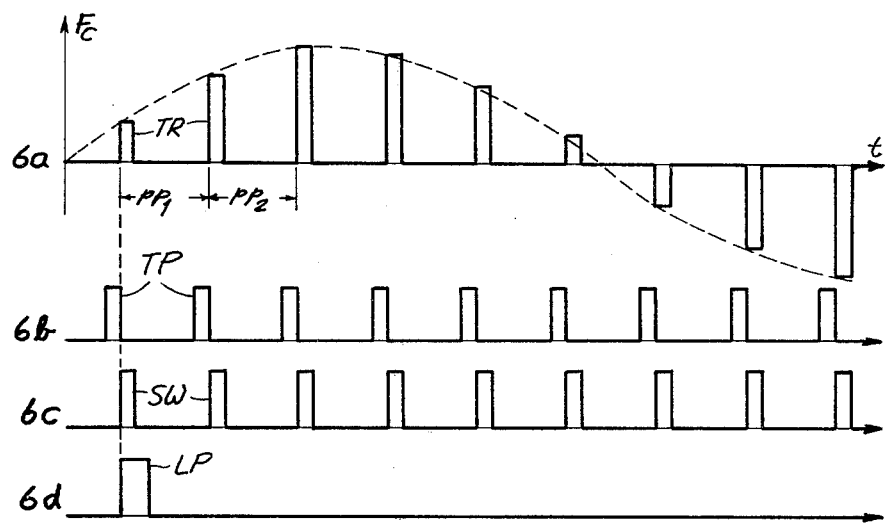
FIG. 6 is a set of graphs serving to explain the operation of the system of FIG. 1.

The relative time positions of pulses TR, TP, SW and LP have been shown in graphs 6a, 6b, 6c and 6d of FIG. 6. Graph 6a also shows carrier frequency $F_c$ plotted against time $t$. It will be noted that the carrier frequency in this instance follows a sinusoidal law, in first approximation, as it jumps by discrete increments in successive pulse periods $pp_1$, $pp_2$ etc. Timing pulses TP, which control the S/H circuit 10 of FIG. 1, occur slightly before pulses TR, SW and LP, the latter being somewhat broader than the others.

For the sake of clarity, the width of these pulses has been exaggerated with reference to the pulse period.

Figure 7:
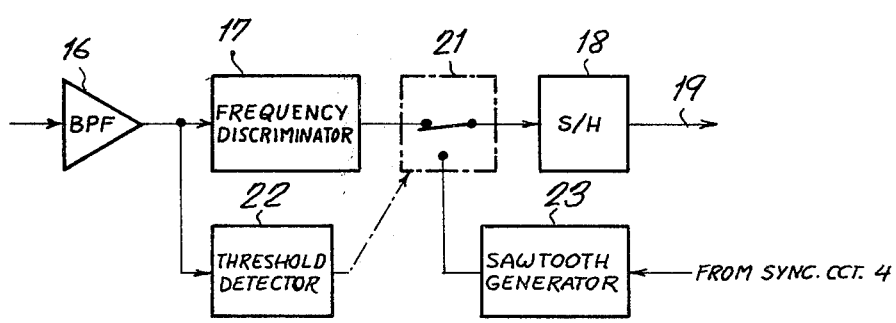
FIG. 7 shows an optional switchover circuit for this system.

If the frequencies $\Delta F$ and $F_i$ are far apart during an initial phase, frequency discriminator 17 may be ineffectual in bringing about a rapid assimilation. It may therefore be advantageous to provide electronic switchover means, represented diagrammatically as contacts 21 in FIG. 7, for energizing the S/H circuit 18 from a sawtooth-wave generator 23 rather than from frequency discriminator 22 and changing to normal operation only when the two frequencies have become more nearly alike. For an automatic switchover I provide a threshold detector 22 in the output of amplifier 16 which has a band-pass characteristic in the vicinity of frequency $F_i$. As long as $\Delta F$ lies outside the pass band, the output amplitude of filtering amplifier 16 is small so that detector 22 does not respond and switch 21 is in its alternate position. When, however, the deviation between the two input frequencies of modulator 14 (FIG. 1) diminishes sufficiently, the amplitude rises above the threshold of detector 22 and causes a reversal of the switch, thereby establishing the normal operating condition described with reference to FIG. 1. Sawtooth generator 23 is controlled by sync circuit 4 to operate in step with the pulse periods.

The operating frequency of master oscillator 41 or 60 need not be constant but may be shifted or wobbled, at a slow rate, to displace the frequency range of the entire system over a large number of cycles.

I claim:

1. In a radar system, in combination:
   a generator of periodic bursts of carrier frequency separated by pulse periods of predetermined duration, said generator having an outgoing channel for the transmission of said bursts of carrier frequency;
   frequency-varying means in said generator for changing said carrier frequency from one pulse period to the next;
   an incoming channel for the reception of echoes of said carrier frequency reflected by a target;
   synchronizing means connected to said frequency-varying means for establishing a repetitive modulation pattern for said carrier frequency having a whole number of repetition periods in a program cycle of n pulse periods;
   a local oscillator having an operating frequency variable in a range offset from the range of said carrier frequencies by a predetermined intermediate frequency, said incoming channel including mixer means connected to said local oscillator for heterodyning said operating frequency with received echoes to produce an output signal of said intermediate frequency for delivery to a utilization circuit;
   modulating means with input connections to said outgoing channel and to said local oscillator for deriving a difference frequency from said operating frequency and said carrier frequency;
   discriminating means connected to said modulating means for converting said difference frequency into a feedback signal having a predetermined mean value upon said difference frequency equaling said intermediate frequency;
   multiple integrating means connected to said discriminating means for simultaneously storing feedback signals from different pulse periods over a plurality of program cycles; and
   control means for said local oscillator connected to said multiple integrating means for individually changing said operating frequency during each pulse period according to the stored feedback signal thereof to make said difference frequency substantially equal to said intermediate frequency.

2. The combination defined in claim 1, further comprising clamping means controlled by said synchronizing means and inserted between said discriminating means and said multiple integrating means for holding said feedback signal constant over each pulse period.

3. The combination defined in claim 2, further comprising a source of sawtooth voltage in step with said pulse periods and switchover means for connecting said source in lieu of said discriminating means to said multiple integrating means during a preliminary operating phase.

4. The combination defined in claim 3 wherein said discriminating means includes filter means in cascade with said modulating means for rejecting difference frequencies remote from said intermediate frequency, and a threshold detector connected to said filter means and controlling said switchover means for initially connecting said source to said multiple integrating means until the difference frequency passed by said filter means reaches a predetermined minimum amplitude.

5. The combination defined in claim 1 wherein said feedback signal has a zero value upon said difference frequency equaling said intermediate frequency, said control means including a summing circuit with additive inputs connected to said multiple integrating means and to said generator for superimposing said feedback signal as an error signal upon a monitoring signal representative of the carrier frequency.

6. The combination defined in claim 1 wherein said multiple integrating means comprises an operational amplifier with n capacitive feedback paths, and an n-stage shift register connected to said synchronizing means for receiving therefrom a recurrent switching signal appearing successively at respective stage outputs of said shift register substantially at the beginning of consecutive pulse periods, said feedback paths being provided with normally open circuit breakers respectively connected to said stage outputs for individual closure by said switching signal during corresponding pulse periods, said shift register further having a loading input connected to said synchronizing means for entry of said switching signal into the first register stage at the beginning of a program cycle.

7. The combination defined in claim 6 wherein said shift register is further provided with clearing inputs for at least its highest-ranking stages connected to said loading input for joint energization at the beginning of a program cycle, thereby enabling a changeover to a program cycle with less than n pulse periods.

8. The combination defined in claim 6 wherein said synchronizing means comprises a master oscillator, a harmonic frequency modifier connected to said master oscillator, a first pulse-shaping circuit connected to said master oscillator for energization thereby, and a second pulse-shaping circuit connected to said frequency modifier for energization thereby, one of said pulse-shaping circuits delivering said switching signal at a higher repetition frequency, the other of said pulse-shaping circuits energizing said loading input with a lower repetition frequency signal equaling 1/n times said higher frequency.

9. The combination defined in claim 1 wherein said incoming channel includes a variable-gain amplifier downstream of said mixer means for stabilizing the amplitude of said output signal, and automatic-gain-control means comprising a control loop with other multiple integrating means for storing corrective signals from different pulse periods over a plurality of program cycles, said automatic-gain-control means being connected to said variable-gain amplifier for stabilizing the gain thereof.

10. The combination defined in claim 9 wherein said control loop further includes sampling and holding means responsive to a gating signal received once per pulse period from said utilization circuit for making said other multiple integrating means responsive to the magnitude of said output signal in a selected fraction of a pulse period.

* * * * *